(12) United States Patent
Geswender et al.

(10) Patent No.: US 8,410,412 B2
(45) Date of Patent: Apr. 2, 2013

(54) GUIDANCE CONTROL FOR SPINNING OR ROLLING VEHICLE

(75) Inventors: Chris E. Geswender, Green Valley, AZ (US); Stevie Alejandro, Sahuarita, AZ (US); Paul Vesty, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/226,749

(22) Filed: Sep. 7, 2011

(65) Prior Publication Data

US 2012/0175459 A1    Jul. 12, 2012

Related U.S. Application Data

(63) Continuation-in-part of application No. 13/005,175, filed on Jan. 12, 2011.

(51) Int. Cl.
*F42B 10/64*    (2006.01)
*F42B 10/26*    (2006.01)

(52) U.S. Cl. ............... 244/3.21; 244/3.23; 244/3.24

(58) Field of Classification Search ............ 244/3.21, 244/3.23, 3.24, 3.25; 102/384, 385, 490
See application file for complete search history.

(56) References Cited

U.S. PATENT DOCUMENTS

| | | | |
|---|---|---|---|
| 4,512,537 A * | 4/1985 | Sebestyen et al. | 244/3.24 |
| 6,073,880 A * | 6/2000 | Voigt et al. | 244/3.24 |
| 6,135,387 A | 10/2000 | Seidel et al. | |
| 6,360,987 B1 * | 3/2002 | Sallaee et al. | 244/3.24 |
| 7,267,298 B2 * | 9/2007 | Leininger | 244/3.24 |
| 7,354,017 B2 | 4/2008 | Morris et al. | |
| 7,412,930 B2 | 8/2008 | Smith et al. | |
| 2010/0320330 A1 * | 12/2010 | McMickell et al. | 244/165 |

OTHER PUBLICATIONS

Application as Filed from corresponding U.S. Appl. No. 13/005,175, filed Jan. 21, 2011.

* cited by examiner

*Primary Examiner* — Tien Dinh
*Assistant Examiner* — Richard R Green
(74) *Attorney, Agent, or Firm* — Renner, Otto, Boisselle & Sklar, LLP

(57) ABSTRACT

A projectile, air vehicle or submersible craft with a spinning or rolling fuselage, rotating on its axis, has a collar which can be positioned relative to a longitudinal axis of the projectile using aerodynamic forces. Aerodynamic surfaces, such as lift-producing surfaces, for example tails or canards, are coupled to the collar, and rotate with the collar. An actuator system or mechanism controls orienting of the lift-producing surfaces, such as tilting of the lift producing surfaces, to direct the collar into a desired position relative to a longitudinal axis of the projectile, and to maintain the collar in that position. With such a control the projectile is able to be steered using bank-to-turn maneuvering. The actuator system may use any of a variety of mechanisms to move the lift-producing surfaces, thereby positioning the collar.

20 Claims, 11 Drawing Sheets

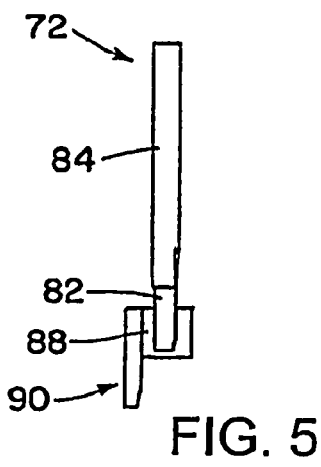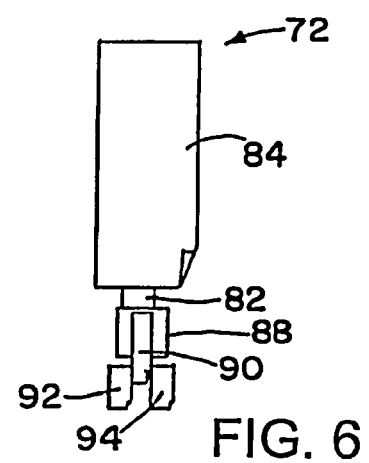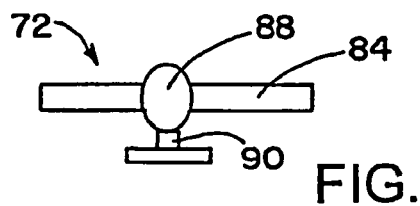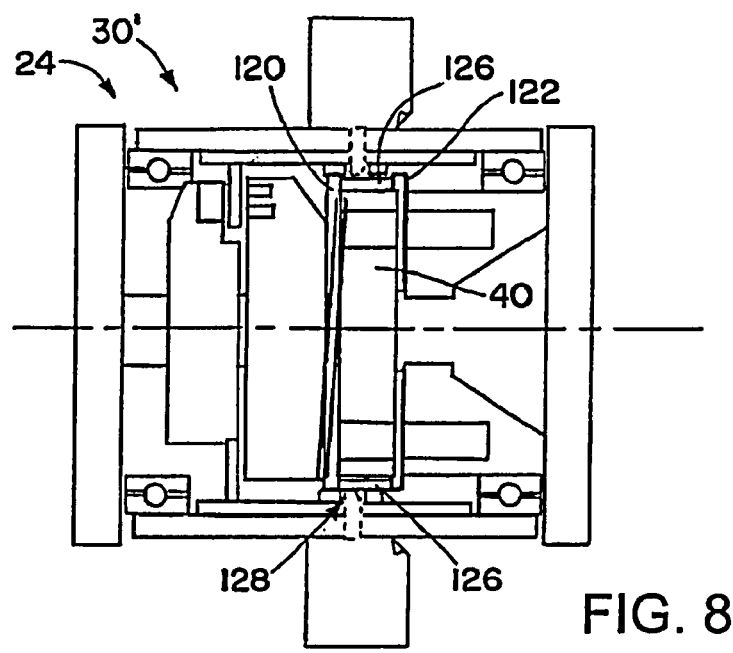

GUIDANCE CONTROL FOR SPINNING OR ROLLING VEHICLE

This application is a continuation-in-part of U.S. application Ser. No. 13/005,175, filed Jan. 12, 2011, which is incorporated herein by reference in its entirety.

BACKGROUND OF THE INVENTION

1. Field of the Invention

The invention is in the field of control systems for spinning, rolling, or roll stabilized vehicles, either airborne or submersible, such as spinning projectiles/missiles.

2. Description of the Related Art

In certain military applications, there is a significant need for "smart" projectiles wherein the operator can effectively control the course the projectile takes and the target location that is impacted. Such navigational control requires the ability to impart precise forces to a rapidly spinning projectile with respect to the Earth inertial frame to achieve a desired directional course. Some past devices have used arrays of propulsive outlets, fuels and pyrotechnics to produce the necessary forces for the desired two-dimensional course correction. However, these devices suffer from significant disadvantages, such as the danger of premature explosion, and the shock caused by these devices often leads to imprecise course corrections.

Other prior devices have used braking or damping to slow the rotation of one section relative to another. However this requires sufficient braking force to restrain a section substantially stationary relative to a spinning or rolling fuselage or body. This can result in a heat dissipation problem, among other issues.

There is a need for a method and apparatus for controlling the spin rate of a two-section, spinning projectile that can control the relative speeds of rotation of the two spinning sections, de-spin one section relative to the other, maintain a non-rotational state relative to an Earth inertial reference frame, and have the ability to reorient the projectile to a new non-rotational state position. There is a further need for such a method and apparatus that is compact, efficient, robust, easily scalable, requires little power, and avoids the disadvantages of known devices.

SUMMARY OF THE INVENTION

According to an aspect of an invention, a collar on a spinning fuselage includes a pair of variable-pitch control surfaces that may be adjusted to position the collar relative to the fuselage.

According to a further aspect of the invention, a projectile includes: a fuselage that rotates about a longitudinal axis of the fuselage; a collar rotatable relative to the fuselage, wherein the collar includes positionable lift-producing control surfaces that are variably positionable relative to a collar housing of the collar; and a mechanism for positioning the lift-producing control surfaces to control position of the collar relative to the fuselage.

According to a still further aspect of the invention, a method of guiding a projectile includes the steps of: positioning a collar of the projectile relative to a spinning fuselage of the projectile, wherein the positioning of the collar is accomplished by selectively controlling positionable lift-producing control surfaces of the collar; and steering the projectile using lift from the collar.

According to another aspect of the invention, a vehicle includes: a fuselage that rotates about a longitudinal axis of the fuselage; a collar rotatable relative to the fuselage, wherein the collar includes positionable lift-producing control surfaces that are variably positionable relative to a collar housing of the collar; and a mechanism for positioning the lift-producing control surfaces to control position of the collar relative to the fuselage.

According to yet another aspect of the invention, a method of guiding a vehicle, the method includes: positioning a collar of the vehicle relative to a spinning fuselage of the vehicle, wherein the positioning of the collar is accomplished by selectively controlling positionable lift-producing control surfaces of the collar; and steering the vehicle using lift from the collar.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 5 is an edge view a variable-pitch control surface of the mechanism of FIG. 2.

FIG. 6 is a side view of the variable-pitch control surface of FIG. 5.

FIG. 7 is a top view of the variable-pitch control surface of FIG. 5.

FIG. 8 is a side sectional view of details of another embodiment of actuating mechanism for the projectile of FIG. 1.

DETAILED DESCRIPTION

A projectile, air vehicle or submersible craft with a spinning or rolling fuselage, rotating on its axis, has a collar which can be positioned relative to a longitudinal axis of the projectile using aerodynamic forces. Aerodynamic surfaces, such as lift-producing surfaces, for example tails or canards, are coupled to the collar, and rotate with the collar. An actuator system or mechanism controls orienting of the lift-producing surfaces, such as tilting of the lift producing surfaces, to direct the collar into a desired position relative to a longitudinal axis of the projectile, and to maintain the collar in that position. With such a control the projectile is able to be steered using bank-to-turn maneuvering. The actuator system may use any of a variety of mechanisms to move the lift-producing surfaces, thereby positioning the collar.

Figure 1:
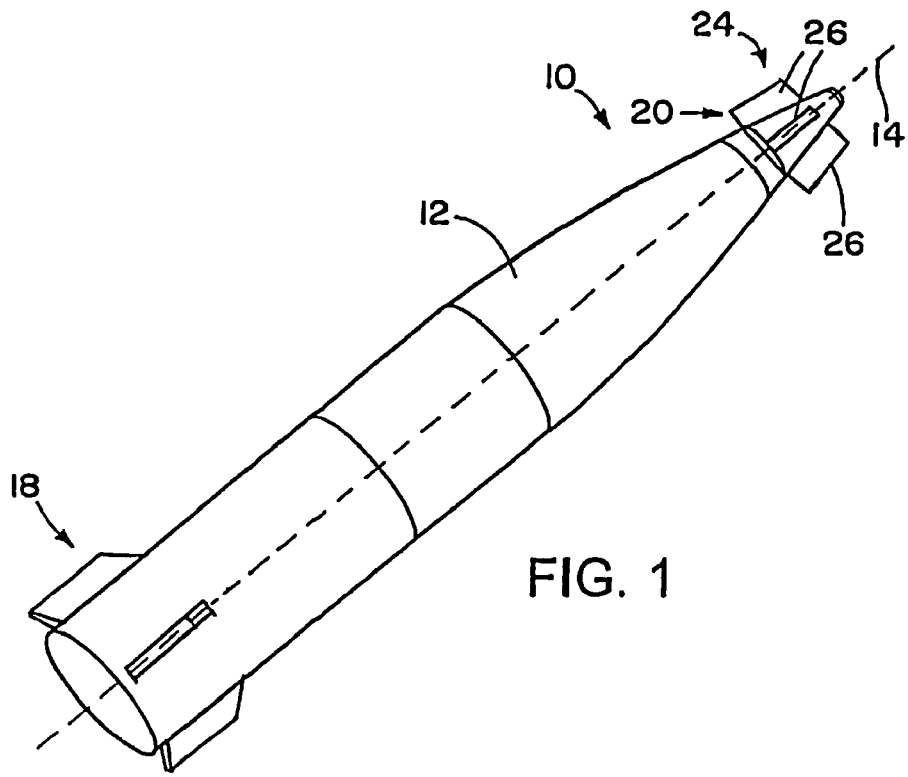
FIG. 1 is a side view of a projectile/missile in accordance with an embodiment of the present invention.

FIG. 1 shows a spin-stabilized projectile 10 that has a fuselage 12 that spins during flight, rotating about a longitudinal axis 14 of the fuselage 12. The projectile 10 may be spun as part of a launching process, and/or may have a spin moment imparted to it during flight, for example using moment-producing surfaces in the airstream, such as angled or otherwise lift-producing canted tail fins 18, canards, or wings, or by using thrust mechanisms.

In the representative example shown in FIG. 1, the projectile also includes a fusewell guidance kit 20 that is coupled to a front end of the fuselage 12. The guidance kit 20 may include a fuse for detonating a warhead or other explosive of the projectile 10 (not shown), perhaps when the projectile 10 is in proximity to a target.

The guidance kit 20 also performs a guidance function used in steering the spin-stabilized projectile 10. The guidance kit 20 includes a collar 24 that is rotatable relative to the spinning fuselage 12. The collar 24 can be positioned relative to the fuselage 12 to position lift-producing aerodynamic surfaces 26 to steer the projectile 10 using bank-to-turn steering. At least some of the aerodynamic surfaces 26 can be used to position the collar 24 so as to perform the desired bank-to-turn steering. To position the collar 24, at least some of the aerodynamic surfaces 26 are able to be moved relative to the collar 24, such as being tilted relative to the collar 24. This positioning of some or all of the aerodynamic surfaces 26 to position the collar 24 may be accomplished through any of a variety of mechanisms, some of which are described in greater detail below.

In the various embodiments described below, the positioning of the collar 24 is described relative to the spinning fuselage 12. It should be appreciated that this includes the situation shown in FIG. 1, that where the collar 24 is part of the guidance kit 20. It also embraces situations where the collar 24 is located elsewhere on the missile 10. Broadly speaking, the collar 24 (and the aerodynamic surfaces 26 that are part of it) may be located at the front end of the projectile (missile), where the control surfaces may be termed canards, the middle of the projectile, where the control surfaces may be termed wings, or the back end of the projectile, where the control surfaces may be termed fins. In addition, some or all of the control surfaces 26 may have characteristics of ailerons, in that they may be set (pitch changed) to produce a roll moment.

Figure 2:
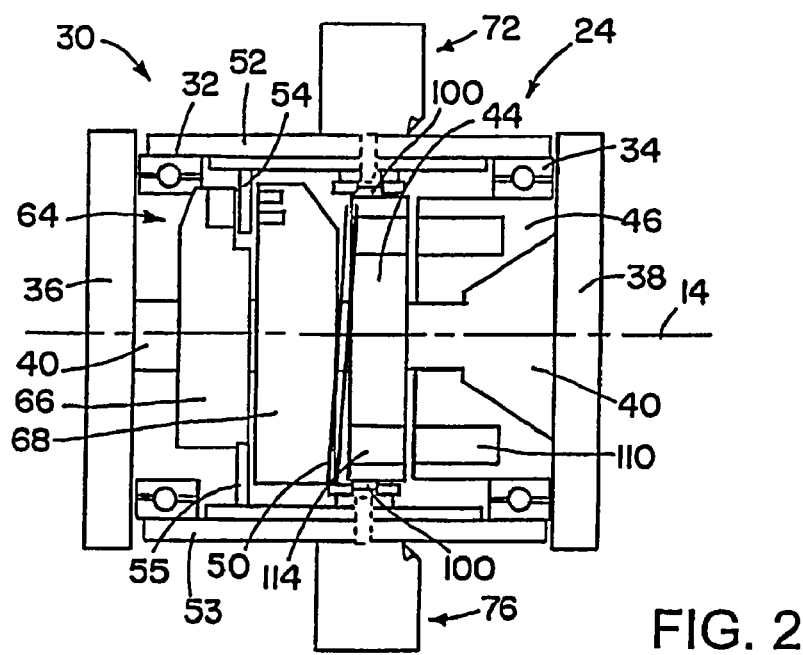
FIG. 2 is a side sectional view of details of one embodiment of mechanism for the projectile of FIG. 1.

FIG. 2 shows a swash plate actuator mechanism 30, one possible mechanism for positioning the collar 24 relative to the fuselage 12. Bearing races 32 and 34 are used to allow the collar 24 to rotate substantially friction-free relative to the fuselage 12. End plates 36 and 38 are at opposite ends of the mechanism 30, with a stalk 40 secured to both of the end plates 36 and 38 to support other parts of the mechanism 30. The end plates 36 and 38 are secured to the fuselage 12, and the end plates 36 and 38 and the stalk 40 rotate along with the fuselage 12 about the longitudinal axis 14. The mechanism 30 includes a swash plate 44, a voice coil actuator 46 for moving the swash plate 44, and a spring 50 for biasing the position of the swash plate 44. The swash plate 44, the voice coil actuator 46, and the spring 50 are all mounted on the stalk 40.

Figure 3:
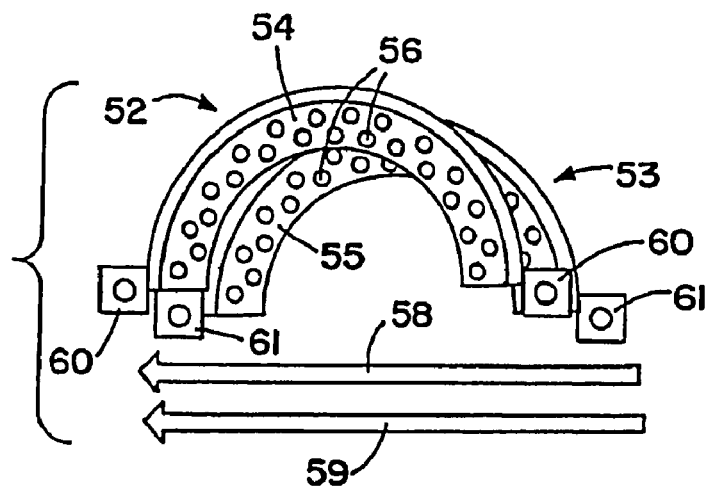
FIG. 3 is a plan view of one collar implementation components of the mechanism of FIG. 2.
Figure 4:
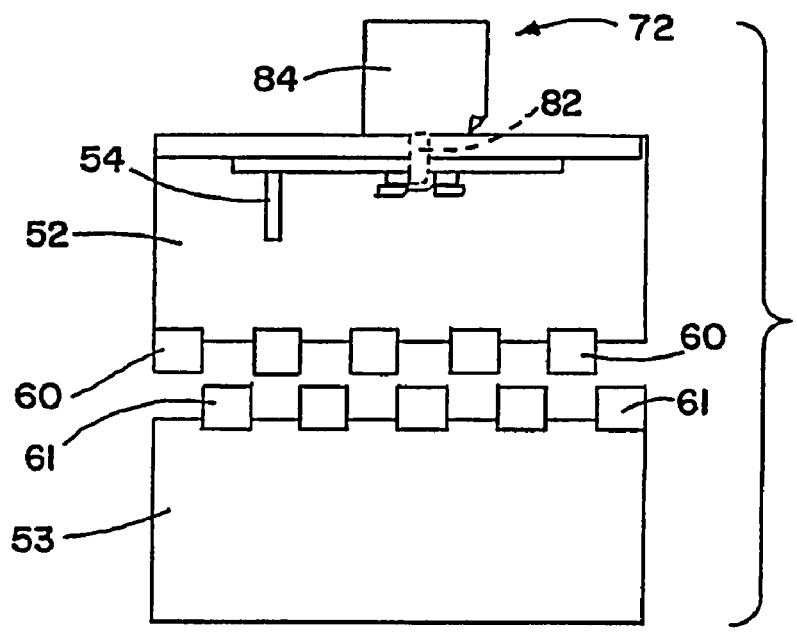
FIG. 4 is a side view of one collar implementation components of the mechanism of FIG. 2.

Referring now in addition to FIGS. 3 and 4, the collar 24 is made up of a pair of shell portions 52 and 53, which have respective plates 54 and 55 that project inward. The plates 54 and 55 have holes 56 in them. A pair of pins 58 and 59 fit through holes in blocks 60 and 61 of the shell portions 52 and 53, in order to couple the shell portions 52 and 53 together. As shown in FIG. 4, the blocks 60 are configured such that the blocks 60 and 61 line up with another as the shell portions 52 and 53 are fitted together. The blocks 60 of the shell portion 52 are offset from the blocks 61 of the shell portion 53, so that the when the shell portions 52 and 53 are assembled the blocks 60 and 61 combine together to produce a pair of channels for receiving the pins 58 and 59, to couple the shell portions 52 and 53 together. The blocks 60 and 61 are shown as located radially external to the shell portions 52 and 53, but it will be appreciated that the blocks 60 and 61 may be located elsewhere relative to the shell portions 52 and 53. For example the blocks 60 and 61 may be located along the inner surfaces of the shell portions 52 and 53.

The shell portions 52 and 53 are attached to the outside of the bearing races 32 and 34 by any of a variety of suitable methods. Inner surfaces or other parts of the shell portions 52 and 53 may be attached to the races 32 and 34 by welding, by use of an adhesive, or by use of suitable fasteners, to give a few examples.

The mechanism 30 includes an apparatus 64 for determining the position of the collar 24 relative to the fuselage 12 (the position in a circumferential direction about the longitudinal axis 14). In the illustrated embodiment the apparatus 64 is an optical apparatus that includes an optical transmitter 66 and an optical receiver 68. The optical transmitter 66 and the optical receiver 68 are both fixedly mounted to the stalk 40. The collar plates 58 and 60 pass between the transmitter 66 and the receiver 68. Light transmitted by the transmitter 66 is received at the receiver 68 only when the holes 56 are aligned with the light path from the transmitter 66 to the receiver 68. Changes in the position of the collar 24 are detected by the apparatus 64 by counting the number of times the light passes through the holes 56 to the receiver 68.

It will be appreciated that alternative configurations are possible for the position-determining apparatus 64. Instead of an optical apparatus, the apparatus 64 may take advantage of the Hall effect, measuring current induced by rotation of an electrical conductor in the presence of a magnetic field. The magnetic field may be produced for example by a number of magnets, such as 48 magnets, on one of the parts of the mechanism 30. Another alternative position-determining device is a slide arm potentiometer.

The mechanism 30 is used for adjusting the position of variable-pitch control surfaces (canards) 72 and 76. The adjustment of position (pitch) of the canards 72 and 76 may be used to position the collar 24 about the longitudinal axis 14. This enables the canards 72 and 76, and/or other control surfaces (such as fixed-position (fixed-pitch) lift-producing control surfaces on the collar 24), to be used for bank-to-turn steering to guide the projectile 10.

FIGS. 5-7 show further details of one of the canards 72. It will be appreciated that the other canard 76 may have a similar configuration. A shaft 82 descends from a blade 84 of the canard 72. The shaft 82 passes through a hole in the shell portion 52 (FIG. 2), and links the blade 84 with a cylindrical body 88 of the canard, which is located inside the shell portions 52 and 53. A side extension 90 extends off to one side of the cylindrical body 88, with a pair of downward-extending tabs 92 and 94 attached to a distal end of the side extension 90. When the canard 72 is installed in the collar 24 the tabs 92 and 94 bracket a protrusion 100 on the outer surface of the swash plate 44, as shown in FIG. 2.

The mechanism 30 operates as follows. The voice coil actuator 46 is used to position the swash plate 44. The voice coil actuator 46 has a number of coils 110 that may be separately activated (powered, with current running through them) to repel portions of the swash plate 44 by repelling magnets 114 circumferentially distributed about the swash plate 44. The spring 50 biases the position of the swash plate 44, by providing a force pushing the swash plate 44 toward the voice coil actuator 46, against the repulsion force from the coil 110. There may be a large number of coils distributed circumferentially about the voice coil actuator 46, with the voice coil actuator 46 for example having 48 coils. The swash plate 44 may have as many magnets as the voice coil actuator 46 has coils, although it will be appreciated that the swash plate 44 may have a greater or lesser number of magnets than the voice coil actuator 46 has coils.

By selectively activating the coils 110 of the voice coil actuator 46, and/or by controlling the amount of current fed to the coils 110, the swash plate 44 is translated along the longitudinal axis 14. This translation of the swash plate 44 shifts the position of the protrusions 100 on the outer surface of the swash plate 44. This in turn causes a shift in the positions of the canards 72 and 76 within the air stream surrounding the fuselage 12. The change in pitch of the canards 72 and 76 is in opposite direction, with one of the canards pitching up while the other pitches down. This makes the canards 72 and 76 act to some degree as ailerons, providing a roll moment on the collar 24. This aerodynamic force on the collar 24 repositions the collar 24 relative to the fuselage 12. The change in position of the collar 24 is detected by the position-determining apparatus 64. The activation of the coils 110 may be periodic, in order to account for the relative rotation between the voice coil actuator 46 and the swash plate 44. The coil activation may be by pulse width modulation, with adjustment of the pulse width and frequency used to achieve and maintain the desired position of the swash plate 44, so as to achieve the desired force on the collar 24 for positioning the collar 24. With appropriate featuring, the swash plate can be angled or tilted rather than translated to effect the same control function.

It will be appreciated that the mechanism 30 may be used to position collar 24 as desired, for example to position the control surfaces (aerodynamic surfaces) 26 to achieve desired bank-to-turn steering of the missile 10. The information from the position-determining apparatus 64 may be used as part of a feedback loop to determine whether further rotation of the collar 24 is needed to achieve a desired collar orientation. The information from the apparatus 64 may also be used to maintain the collar 24 in a desired orientation, either relative to the rest of the missile 10, or relative to a coordinate system that does not vary with missile movement.

The control of the mechanism 30 may be accomplished by any of a variety of devices, for example by a controller that may include a processor and/or integrated circuit. The controller may be located in any of a variety of locations in the missile 10. It will be appreciated that it is well known how to use a controller to control actuation and/or positioning of a device, so further details concerning the controller are omitted. When a signal is sent to the controller to place the collar 24 at a new position, or when the controller determines that the collar 24 is not at a desired position, the controller adjusts the position of the swash plate 44, for example by changing the strength and/or timing of the current provided to the coils 110 of the voice coil actuator 46. The controller may be integrated with and/or coupled to a navigation system (not shown) for guiding the missile 10 to an intended target or other destination, and making a determination of the collar positions needed to steer the missile 10 along a path to reach the intended destination. The controller also or alternatively may be integrated with and/or coupled to a communications system for sending and/or information, for example for receiving guidance information for guiding the missile 10 to an intended destination and/or on an intended path.

The components of the actuator mechanism 30 may be made of suitable materials. Structural parts may be made of suitable metals and alloys, and electrically conductive parts may be made of suitable conductive materials.

FIG. 8 illustrates an alternative embodiment, a mechanism 30' that is similar to the mechanism, except for the addition of a pair of guide plates 120 and 122 on longitudinally opposite sides of the swash plate 44, which engage inward control surface protrusions 126 between them. The protrusions 126 may be located adjacent to the circumference of the swash plate 44, in a channel 128 defined by the guide plates 120 and 122.

Figure 9:
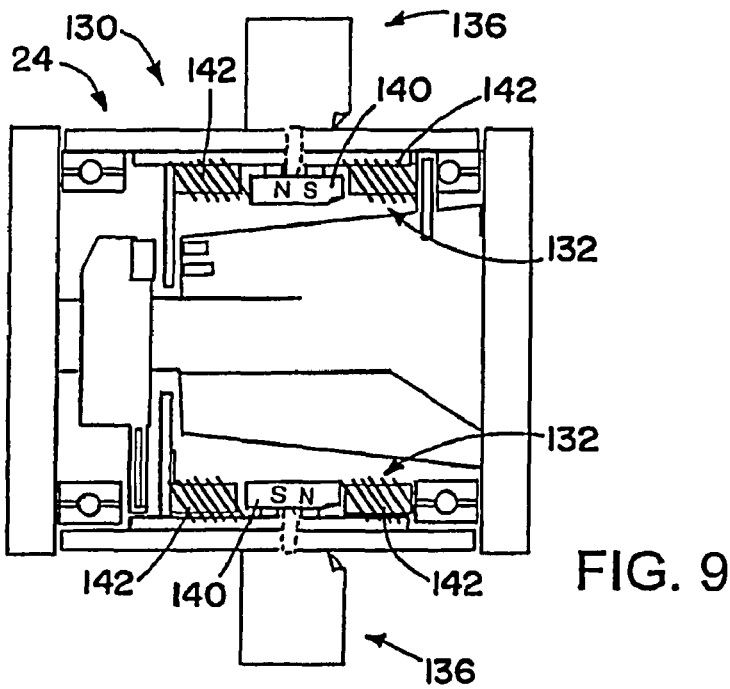
FIG. 9 is a side sectional view of details of yet another embodiment of mechanism for the projectile of FIG. 1.
Figure 10:
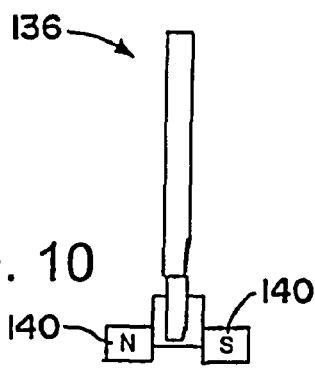
FIG. 10 is a side view of the variable-pitch control surface of FIG. 9.
Figure 11:
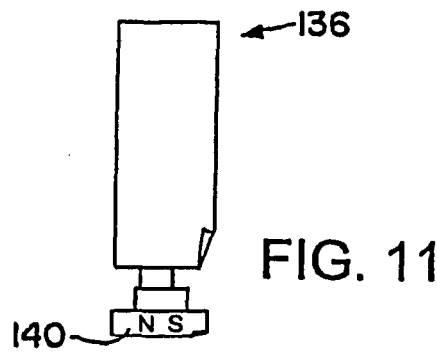
FIG. 11 is a top view of the variable-pitch control surface of FIG. 9.

FIGS. 9-11 illustrate another embodiment, a mechanism 130 for positioning the collar 24 relative to the spinning fuselage 12 (FIG. 1) of the missile/projectile 10 (FIG. 1). The mechanism 130 includes a pair of voice coil actuators 132 for selectively shifting position of, such as by tilting, aerodynamic surfaces 136 to control movement of the collar 24, such as to position the collar 24 for turn-to-steer maneuvering of the missile 10.

Figure 12:
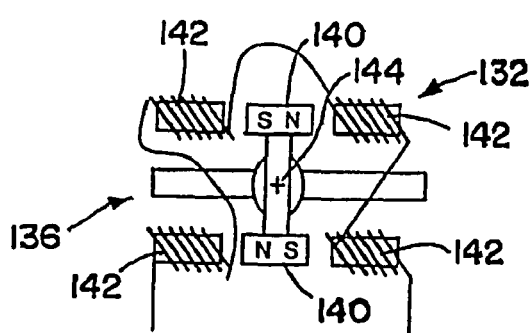
FIG. 12 is a plan view illustrating the operation of the actuation mechanism of the mechanism of FIG. 9.

With reference now in addition to FIG. 12, the voice coil actuators 132 are used to selectively attract magnets 140 that are on ends of the control surfaces 136 that are inside of the collar 24. The magnets 140 are located near coils 142 of the voice coil actuators 132, such that when current is run through the coils 142, the coils 142 attract the magnets 140. Each of the control surfaces 136 has a pair of magnets 140 at a distance from a central axis 144 about which the control surface 136 rotates. The magnets 140 are oriented such that north poles N of the two magnets 140 are diametrically opposed across the central axis 144, and south poles S of the two magnets 140 are diametrically opposed across the central axis 144.

Each of the voice coil actuators 132 may have four of the coils 142, wired together such that positive or negative current flowing through them will twist (rotate) the control surface 136 in one direction or the opposite direction. The voice coil actuators 132 may be activated individually or separately to tilt one or more of the control surfaces 136, in order to position the collar 24 (and thereby the control surfaces 136) as desired. The positioning may be controlled by a controller, such as described above with regard to the mechanism 30 (FIG. 2).

It will be appreciated that the mechanism 130 may be used for positioning any suitable number of control surfaces (aerodynamic surfaces) 136. Two or four control surfaces 136, with associated actuators 132, may be employed, but other numbers of control surfaces may also be used. As with the mechanism 30, there may be both variable-pitch positionable lift-producing surfaces, and fixed-pitch lift-producing surfaces.

Other parts of the mechanism 130 may be similar to those of the mechanism 30 (FIG. 2). Since the functioning of these similar parts is described above with regard to the mechanism 30, further discussion is omitted with regard to this embodiment.

Figure 13:
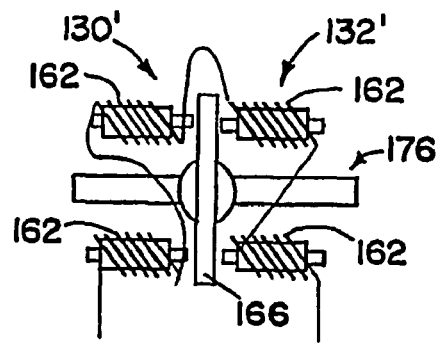
FIG. 13 is a plan view illustrating an alternative actuation mechanism according to still another embodiment of the invention.

FIG. 13 shows an alternative configuration, in which solenoids 162 are used in an actuator 132' in a mechanism 130'. The solenoids 162 are used in place of the coils 142 (FIG. 9) in the voice coil actuator 132 (FIG. 9) of the mechanism 130 (FIG. 9). Current is selectively provided to the solenoids 162 to magnetize the solenoids 162, in order to selectively attract portions of a plate 166 of a control surface 176. The control surface plate 176 is located inside the shell of the collar 24 (FIG. 9). This attraction by selected solenoids 162 rotates the control surface 176 about its axis, tilting the control surface to provide force for turning the collar 24 (FIG. 9) to position the collar 24 in a desired orientation. The solenoids 162 may be activated (current flowing through them) for a time period, and/or at a given rate, to position the control surfaces 176 in order to achieve a desired force on the collar 24, for positioning the collar 24. More then one solenoid 162 may be activated at a time, for example with diametrically opposed (diagonal) solenoids 162 being activated. The solenoids 162 may only be able to accomplish step-like rotations of the control surfaces, rotating the control surfaces 176 only in discrete steps, thereby changing pitch only discretely. To maintain the collar 24 in fixed position or orientation (fixed relative to the environment surrounding the missile 10) it may be necessary to alternately activate or deactivate the solenoids 162. The control surfaces 176 may thus be sequentially tilted or straightened, or may be sequentially tilted in opposite directions. It will be appreciated that a pulse width, sequencing, and frequency of solenoid firing may be selected to achieve a desired net force and/or position on the collar 24. Varying the duty cycle will allow semi-proportional control of the position (pitch) of the control surfaces 176.

Figure 14:
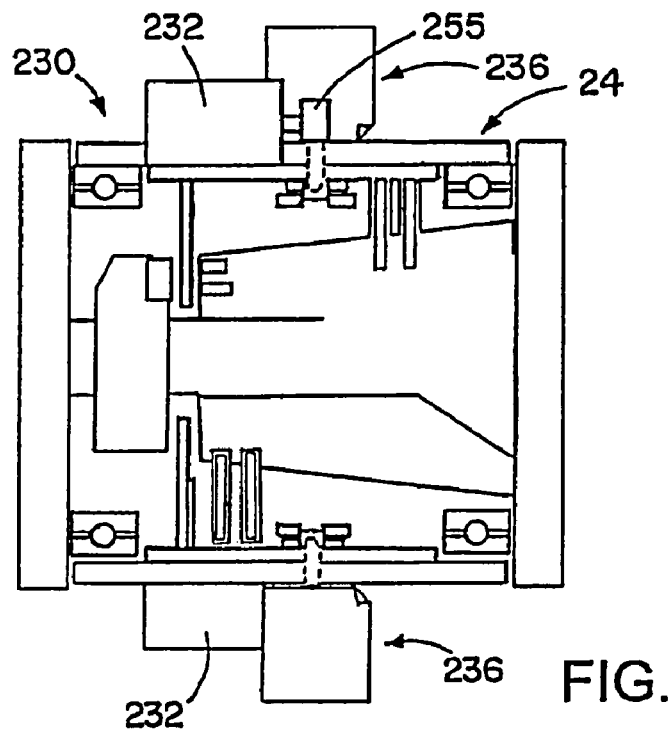
FIG. 14 is a side sectional view of details of still another embodiment of mechanism for the projectile of FIG. 1.
Figure 15:
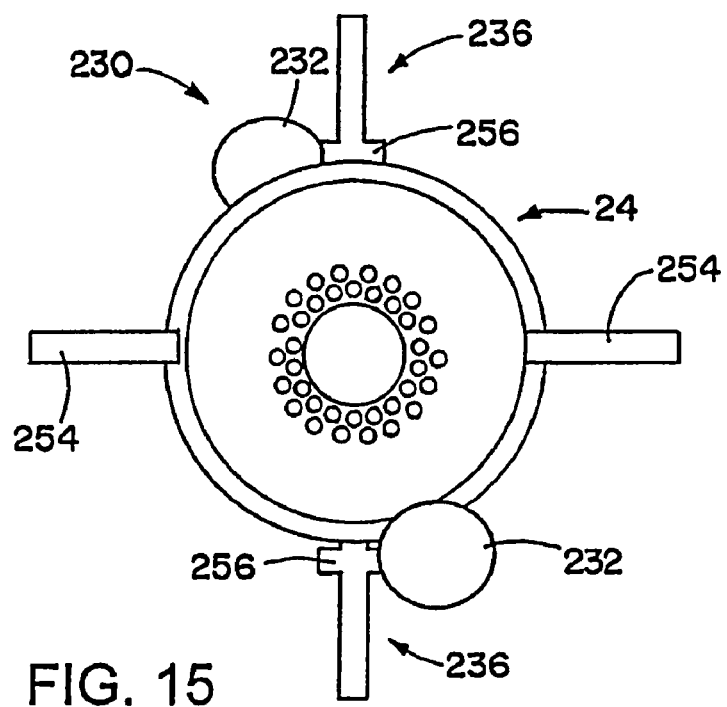
FIG. 15 is an end view of the mechanism of FIG. 14.

FIGS. 14 and 15 illustrate another embodiment, a mechanism 230 in which motors 232 are used to tilt (change the pitch of) control surfaces 236. The tilting of the control surfaces 236 provides an aerodynamic force on a collar 24, to position the collar 24 relative to the fuselage 12 (FIG. 1). Other control surfaces 254 may have fixed pitch.

Shafts 255 of the motors 232 and bases 256 of the control surfaces 236 may be coupled together using corresponding sloped helical toothed surfaces that mesh together. The toothed surfaces mesh such that rotation of the motor shaft causes a tilt in the control surfaces 236. Power may be selectively applied to the motors 232 to change the pitch of the control surfaces 236 in either direction.

The mechanism 130' and 230 described above may use many of the same elements as the mechanism 30, which was described in detail above. The controller described above for the mechanism 30 may also be used to control the operation of the other mechanisms described herein.

It will be appreciated that other mechanisms may also be used for adjusting the position of the collar 24 relative to the position of a spinning fuselage. For example a ring motor may be used to position the collar 24. An example of a ring motor (used for another purpose) is that shown and described in U.S. Pat. No. 7,039,309, the specification and drawings of which are incorporated herein by reference.

Figure 16:
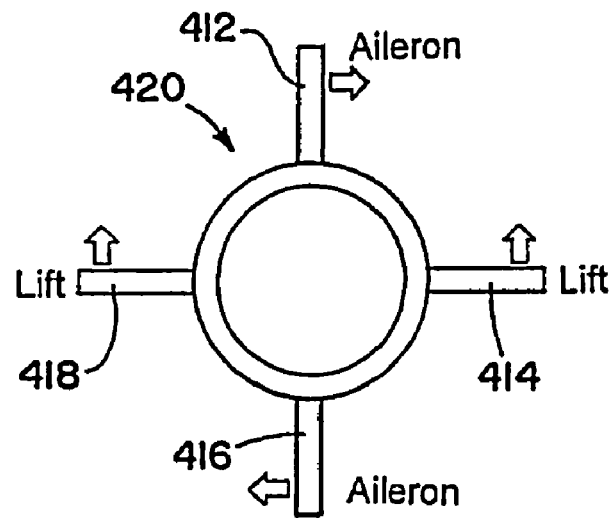
FIG. 16 is an end view illustrating clockwise roll positioning of the collar of the projectile/missile of FIG. 1.
Figure 17:
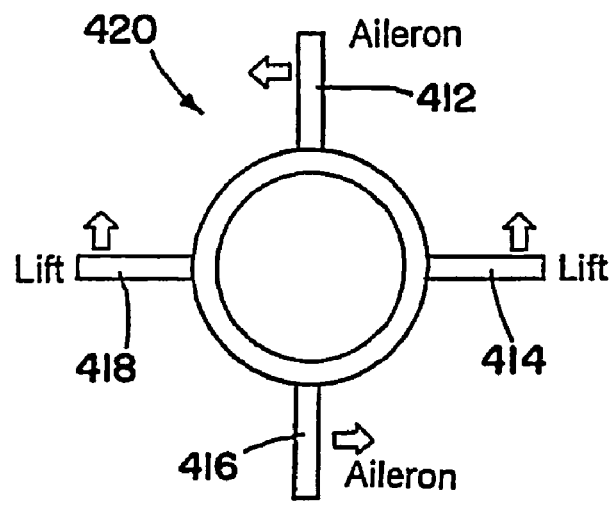
FIG. 17 is an end view illustrating counter clock wise bank-to-turn steering once the collar of the projectile/missile of FIG. 1 is in position.

Referring now to FIGS. 16 and 17, one possible employment of control surfaces 412-418 on a movable collar 420 is illustrated. The control surfaces 412 and 416 are variable-pitch control surfaces, with their pitch alterable using any of the various mechanisms described above. The control surfaces 412 and 416 function as ailerons, and may be used to provide lift to rotate the collar in either a clockwise direction (FIG. 16) or a counterclockwise direction (FIG. 17). The positioning of the variable-pitch control surfaces 412 and 416 may be in discrete steps of pitch, such as with the solenoids 162 (FIG. 13) of the mechanism 130' (FIG. 13). Alternatively the positioning of the pitch of the control surfaces 412 and 416 may be substantially continuous, for example being positioned using the swash plate 44 (FIG. 2) of the mechanism 30 (FIG. 2).

The control surfaces 414 and 418 are fixed lift-producing control surfaces, whose pitch is not altered. The lift-producing control surfaces 414 and 418 provide the lift for the bank-to-turn maneuvering. The variable-pitch control surfaces 412 and 416 position the collar 420 so that the lift from the fixed control surfaces 414 and 418 change the course of the missile in a desired direction.

The mechanisms described above can be used in any of a wide variety of aircraft. Examples of aircraft that could use the above-described mechanisms include missiles, fuze kits, submunitions, small guided rockets, small hand launched grenades, submersibles, and unmanned aircraft systems. The terms "projectile" and "missile" are used interchangeably herein broadly to include both powered and unpowered air vehicles of various types, including the examples listed in the previous sentence.

The mechanisms described above advantageously provide control of collar position over a wide range of conditions. The mechanisms can handle high levels of dynamic pressure on the collar, levels that can tax the braking capacity of systems that rely on braking to control the positioning of a collar relative to a spinning fuselage. The mechanisms can also handle low levels of dynamic pressure. Low levels of dynamic pressure can be difficult for other systems (such as braking systems) to handle because collar drag can make it difficult to maintain proper positioning of the collar. By decoupling the rotation of the collar from the rotation of the fuselage, except when corrections/changes are needed to collar position, only relatively small amounts of power are required for positioning the collar. In addition, the heat dissipation problems that may occur with braking configurations or configurations that rely on fiction are avoided. Further, devices using friction may have high tolerance requirements, which are avoided in the mechanisms and devices described herein.

Figure 18:
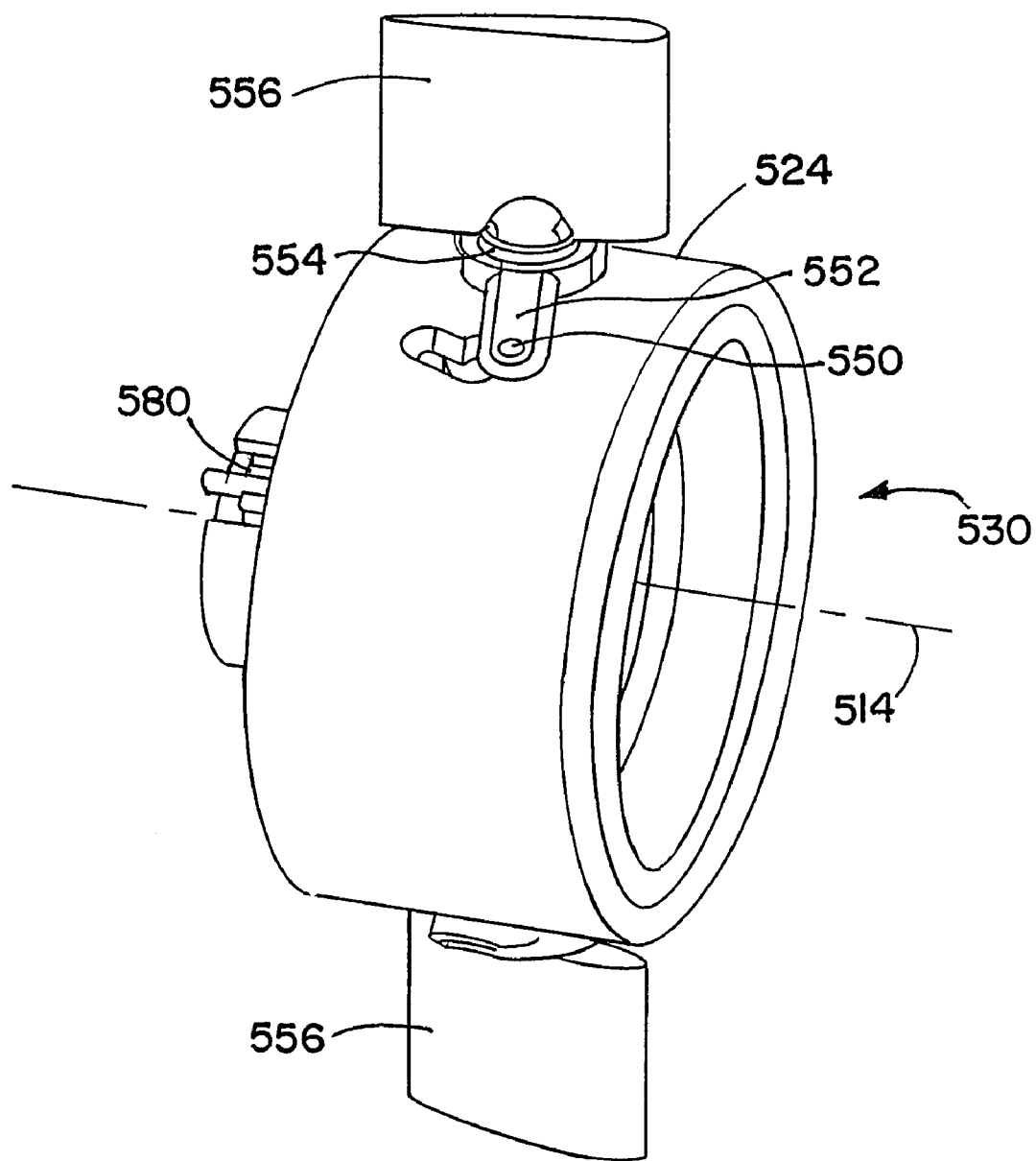
FIG. 18 is an oblique view of an alternate embodiment swash plate actuator mechanism in accordance with the invention.
Figure 19:
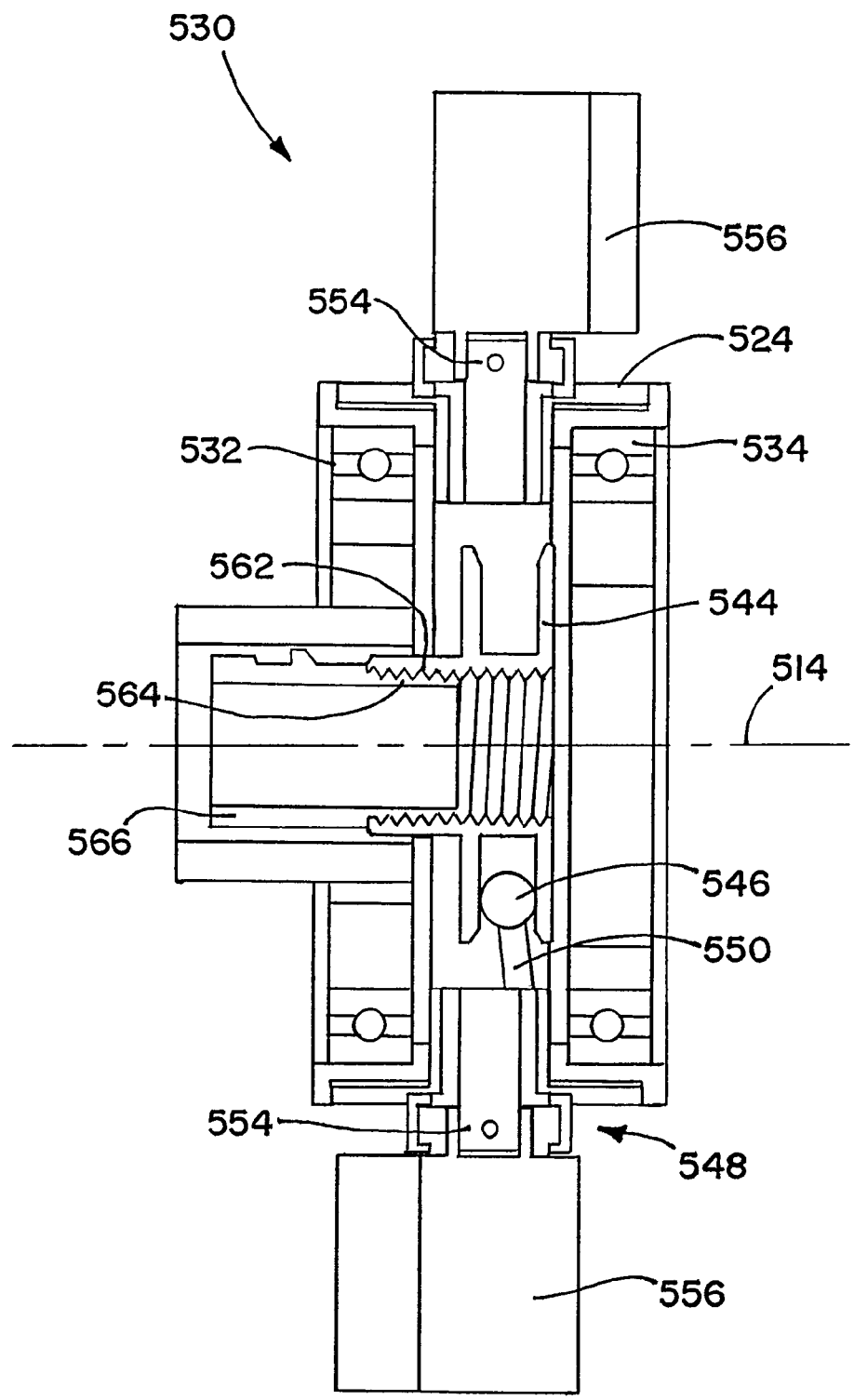
FIG. 19 is a side cross-sectional view of the actuator mechanism of FIG. 18.

FIGS. 18 and 19 shows another alternate embodiment, a swash plate actuator mechanism 530 for positioning a collar 524 relative to a fuselage of a vehicle or object rotating about its longitudinal axis 514. Bearings 532 and 534 allow the collar 524 to rotate freely relative to the fuselage. The mechanism 530 includes a swash plate 544 that receives ball ends 546 of a rotational mechanism 548 that is coupled through bars 550 to arms 552 that protrude from shafts 554 about which ailerons 556 rotate.

Figure 20:
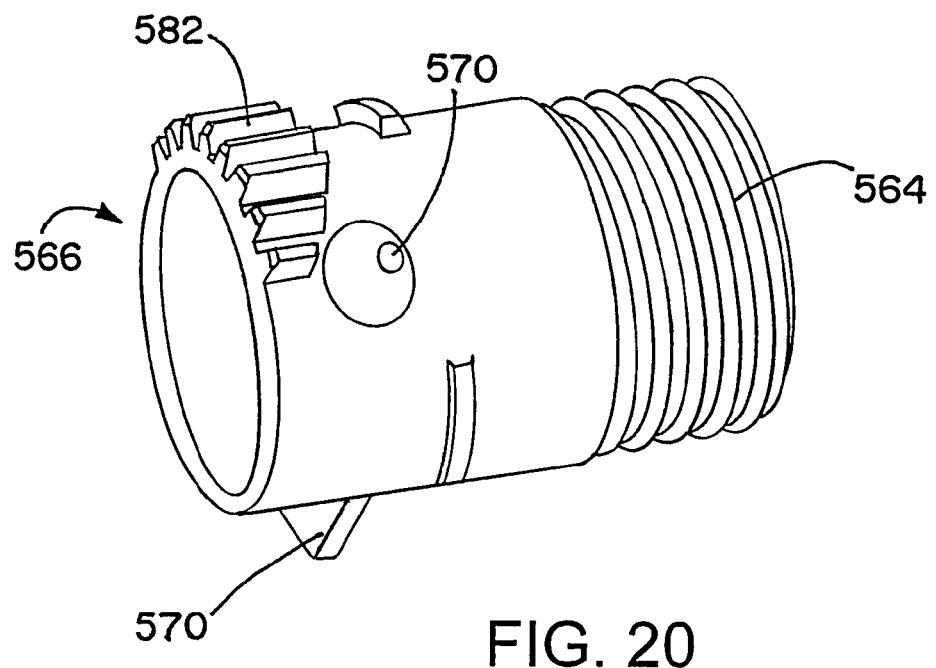
FIG. 20 is an oblique view of a telescope, part of the actuator mechanism of FIG. 18.
Figure 21:
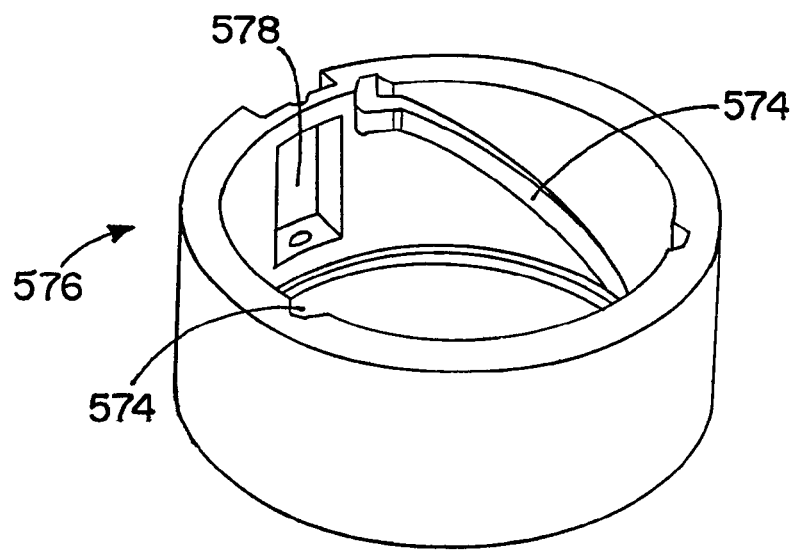
FIG. 21 is an oblique view of a cam base and driving pinion, parts of the actuator mechanism of FIG. 18.

The swash plate 544 has a threaded inner surface 562 that engages with a threaded outer surface 564 of a telescope 566, coupling together the swash plate 544 and the telescope 566. With reference in addition to FIGS. 20 and 21, the telescope 566 has followers 570 that engage cam grooves 574 in the inner surface of a cam base 576 that surrounds the telescope 566. The cam base 576 has an opening 578 for receiving a driving pinion 580 (FIG. 18). The driving pinion 580 engages gear teeth 582 at one end of an outer surface of the telescope 566. The threaded surface 564 and the gear teeth 582 are at opposite ends of the telescope 566. As the driving pinion 580 rotates about its axis, this rotation is transmitted to the telescope 566, via the gear teeth 582. The rotation of the telescope 566 about the longitudinal axis 514 moves the telescope 566 in a longitudinal direction, as the followers 570 move along the cam grooves 574. This moves the swash plate 544 in the longitudinal direction as well, since the swash plate 544 is threadedly coupled to the telescope 566. Motion of the swash plate 544 is transmitted to the ailerons 556 via the rotational mechanism 548. Thus turning the driving pinion 580 results in changing the angle of attack of the ailerons 556. Controlling the rotation of the driving pinion 580 controls the positioning of the ailerons 556.

Figure 22:
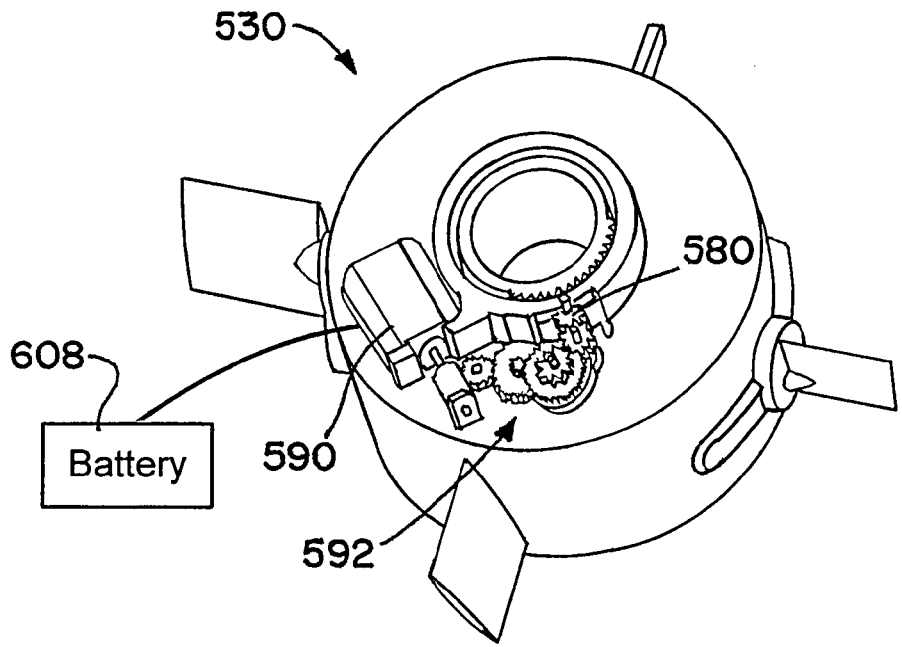
FIG. 22 is an oblique view showing the back of the actuator mechanism of FIG. 18.
Figure 23:
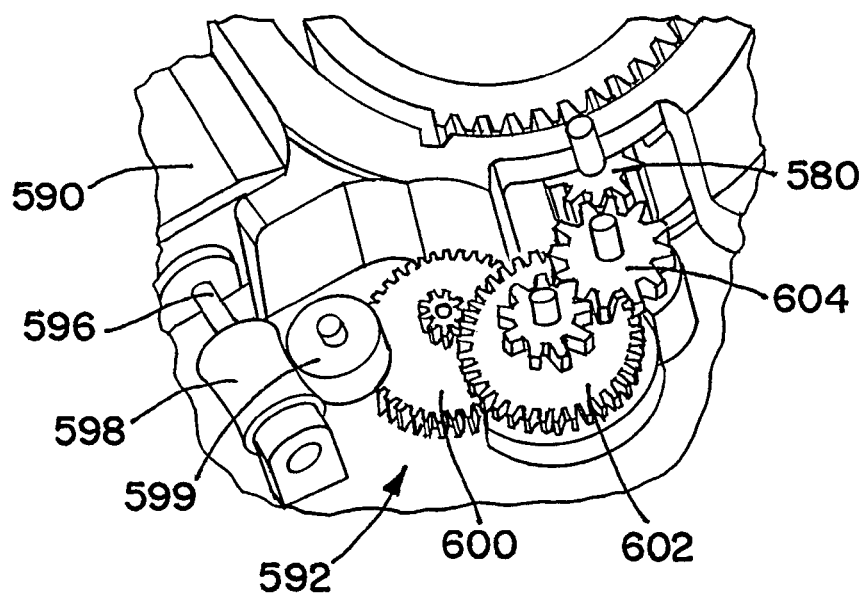
FIG. 23 is a close-up view of part of the view of FIG. 22.

Referring now to FIGS. 22 and 23, the driving pinion 580 is driven by a motor 590, with a gear train 592 transmitting turning of the motor 590 to the driving pinion 580. The motor 590 turns a shaft 596 having a worm gear 598 on it. A helical gear 599 transmits the rotation of the worm gear 598 to a series of spur gears 600, 602, and 604. The last spur gear 604 has teeth that engage the driving pinion 580.

The use of the gear train 592 allows a high gear ratio between the motor 590 and the telescope 566. For example the gear ratio may be about 1400:1, with 1400 revolutions of the motor shaft corresponding to one revolution of the telescope 566, although the telescope 566 does not make complete revolutions about its axis, but only partial revolutions. The gearing allows a small motor to accomplish the turning of the ailerons 556 relative to the rest of the collar 524 in order to position (and maintain the position) of the collar 524.

The motor 590 and the elements of the gear train 592 may be mounted in suitable structures that are part of the cam base 576. The motor 590 may be any of a variety of types of motors, such as DC brushless motors or small stepper motors. The motor 590 may be powered by a battery 608. The motor 590 may have a dedicated battery that only powers the motor 590, or alternatively the battery 608 may also power other components.

The actuator mechanism 530 has the advantage of requiring only a small amount of power to accomplish the actuation of the swash plate 544, and thus the ailerons 556. The battery 608 may have a capacity of at least 30 milliamp-hours, for instance having a capacity of from 30 to 200 milliamp-hours, in order to actuate the swash plate 544 during the flight of a spinning or rolling projectile, missile, or other air vehicle.

Figure 24:
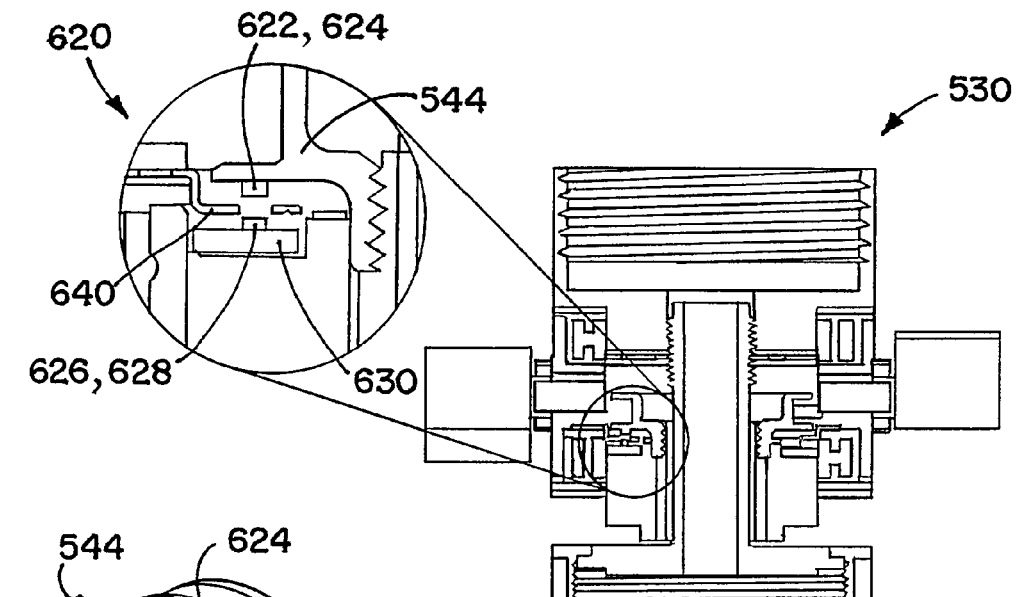
FIG. 24 is a view showing various parts of an optical system of the actuator mechanism of FIG. 18.
Figure 25:
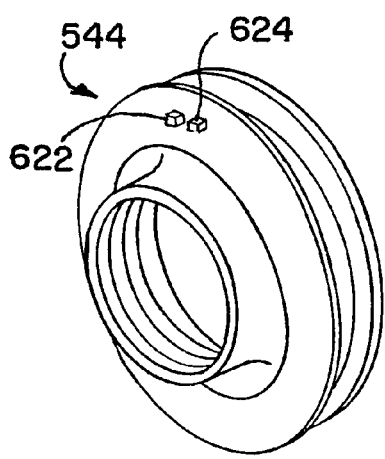
FIG. 25 is an oblique view of the swash plate, showing the optical transmitters of the optical system of FIG. 24.
Figure 26:
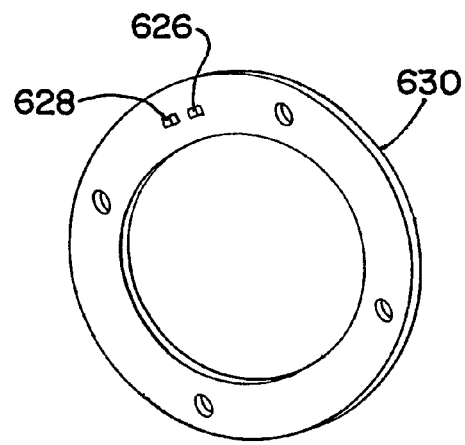
FIG. 26 is an oblique view of an annular plate of the actuator mechanism, showing the optical receivers of the optical system of FIG. 24.

The mechanism 530 includes an optical system 620 (FIG. 24) for detecting position of the collar 524 as it moves relative to the fuselage. The optical system 620 includes a pair of optical transmitters 622 and 624 on a bottom surface of the swash plate 544 (FIG. 25), and a pair of optical receivers 626 and 628 on a top surface of an annular plate 630 (FIG. 26), with the optical receivers 626 and 628 in line with the optical transmitters 622 and 624. The swash plate 544 and the annular plate 630 are both coupled to the fuselage, so that they rotate with the fuselage.

Figure 27:
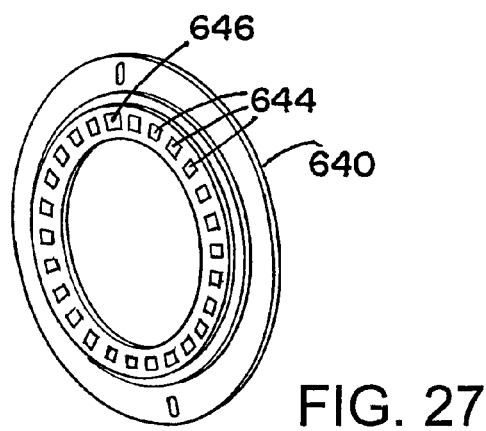
FIG. 27 is an oblique view an encoder wheel of the optical system of FIG. 24.

Between the swash plate 544 and the annular plate 630 is an optical encoder wheel 640 (FIG. 27) that is mounted to and rotates with the collar 524. The encoder wheel 640 includes a series of openings 644 that include a reference opening 646. The optical transmitters 622 and 624 emit light, which is received at the optical receivers 626 and 628 only when the openings 644 in the encoder wheel 640 are aligned with the light path from the transmitters 622 and 624 to the receivers 626 and 628. The reference opening 646 may be different from the other openings 644, for example being at a different pitch than the other openings 644, in such a way that its detection can be noted at the optical receivers 626 and 628. The rotation speed of the collar 524, relative to that of the fuselage, may be determined from observing the frequency at which the openings 644 pass between the transmitters-receiver combinations. The reference opening 646 may be used to determine the direction of the relative rotation. If the receiver 626 detects the reference opening 646 before the receiver 628 does, the relative rotation is in one direction. If the receiver 628 detects the reference opening 646 before the receiver 626 does, the relative rotation is the opposite direction.

The features shown and described with regard to the mechanism 530 may be combined with features of other embodiments described herein, where suitable. Similarly, features and elements that are common to the embodiment shown in FIGS. 18-24 and other embodiments described herein, are omitted from the discussion of the embodiment of FIGS. 18-24.

The mechanism 530 provides a simple and reliable way of positioning the collar 524 for use in bank-to-turn steering, or for other purposes. Power requirements are low, and the optical system 620 provides an easy, accurate, and cheap way of tracking changes in position of the collar 524 relative to the fuselage. Other known sensors may be used for tracking the rotation of the fuselage as it spins or rotates about its longitudinal axis.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A vehicle comprising:
a fuselage that rotates about a longitudinal axis of the fuselage; and
a collar rotatable relative to the fuselage, wherein the collar includes positionable lift-producing control surfaces that are variably positionable relative to a collar housing of the collar to produce a roll moment on the collar to position the collar; and a positioning mechanism—controlling position of the collar relative to the fuselage by—positioning the lift-producing control surfaces;

wherein the positioning mechanism includes a swash plate that is mechanically coupled to the positionable lift-producing surfaces; and wherein positioning the swash plate positions the positionable lift-producing control surfaces.

2. The vehicle of claim 1,
wherein the lift-producing control surfaces are variable-pitch control surfaces; and
wherein the positioning mechanism varies pitch of the variable-pitch control surfaces to produce aerodynamic forces to position the collar.

3. The vehicle of claim 1, wherein the collar is part of a fusewell guidance device that is mechanically coupled to the fuselage.

4. The vehicle of claim 3, wherein the fusewell guidance device includes a fuse for detonating the vehicle.

5. The vehicle of claim 1, further comprising a motor that is mechanically coupled to the swash plate, to position the swash plate.

6. The vehicle of claim 5, wherein the positioning mechanism further includes a gear train that mechanically couples to a shaft of the motor.

7. The vehicle of claim 6,
wherein a pinion of the gear train meshes with teeth on a telescope that is fixedly coupled to the swash plate; and
wherein the telescope has followers that engage grooves in a cam base, such that rotation of the pinion rotates the telescope, causing motion of the telescope and the swash plate in a longitudinal direction.

8. The vehicle of claim 5, wherein the motor is a battery-driven electric motor driven by a battery that has a capacity of from 30 to 200 milliamp-hours.

9. The vehicle of claim 1, further comprising a position-determining apparatus for determining position of the collar relative to the fuselage.

10. The vehicle of claim 9,
wherein the position-determining apparatus includes:
an optical encoder wheel having openings therein;
one or more optical transmitters; and
one or more optical receivers;
wherein the optical encoder wheel is located between the one or more optical transmitters and the one or more optical receivers;
wherein the optical encoder wheel rotates relative to the one or more optical transmitters and the one or more optical receivers; and
wherein optical signals received at the one or more optical receivers indicate passage of the openings past the one or more optical receivers.

11. The vehicle of claim 10,
wherein the one or more optical transmitters includes a pair of optical transmitters;
wherein the one or more optical receivers includes a pair of optical receivers;
wherein the openings include a reference opening that has different characteristics from the other openings; and
wherein which of the optical receivers first detects the reference opening is used to determine a rotation direction of the collar relative to the fuselage.

12. The vehicle of claim 1, wherein the collar also includes fixed-pitch lift-producing control surfaces.

13. The vehicle of claim 12,
wherein the fixed-pitch control surfaces are diametrically opposed to one another; and
wherein the positionable control surfaces are diametrically opposed to one another.

14. The vehicle of claim 1, wherein the vehicle is an air vehicle.

15. The vehicle of claim 1, wherein the vehicle is an unpowered projectile.

16. A method of guiding a vehicle, the method comprising:
positioning a collar of the vehicle relative to a spinning fuselage of the vehicle, wherein the positioning of the collar is accomplished by selectively controlling positionable lift-producing control surfaces of the collar to produce a roll moment on the collar, with the positioning including using a swash plate that is mechanically coupled to the lift-producing control surfaces; and
steering the vehicle using lift from the collar.

17. The method of claim 16,
wherein the positionable lift-producing control surfaces are variable-pitch control surfaces; and
wherein the positioning the control surfaces includes changing pitch of the variable-pitch control surfaces.

18. The method of claim 17,
wherein the changing the pitch includes changing the pitch by moving the swash plate; and
wherein the moving the swash plate is accomplished by a battery-powered electric motor.

19. The method of claim 18, wherein the moving the swash plate includes transmitting torque from the motor through a gear train that is mechanically coupled to both the motor and the swash plate.

20. A vehicle comprising:
a fuselage that rotates about a longitudinal axis of the fuselage; and
a color rotatable relative to the fuselage, wherein the collar includes:
diametrically-opposed positionable lift-producing control surfaces that are variably positionable, and are mechanically coupled with one another such that varying the position of the lift-producing control surfaces provides a net roll moment on the collar; and;
diametrically-opposed fixed-pitch control surfaces that provide lift in the same direction, such that fixed-pitch control surfaces provide lift for steering and substantially no net roll moment on the collar; and
a positioning mechanism controlling position of the collar relative to the fuselage by positioning the positionable lift-producing control surfaces.

\* \* \* \* \*